United States Patent
Vengerov (10) Patent No.: US 8,356,061 B2
(45) Date of Patent: Jan. 15, 2013

(54) MAXIMIZING THROUGHPUT FOR A GARBAGE COLLECTOR

(75) Inventor: David Vengerov, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 405 days.

(21) Appl. No.: 12/144,100

(22) Filed: Jun. 23, 2008

(65) Prior Publication Data

US 2009/0319255 A1     Dec. 24, 2009

(51) Int. Cl.
*G06F 17/30*     (2006.01)
(52) U.S. Cl. .................. 707/813; 707/206; 714/38
(58) Field of Classification Search .......... 707/813, 707/206; 714/38
See application file for complete search history.

(56) References Cited

U.S. PATENT DOCUMENTS

| | | | | |
|---|---|---|---|---|
| 6,226,653 | B1 * | 5/2001 | Alpern et al. | 1/1 |
| 2003/0182597 | A1 * | 9/2003 | Coha et al. | 714/38 |
| 2006/0230087 | A1 * | 10/2006 | Andreasson | 707/206 |

* cited by examiner

*Primary Examiner* — James Trujillo
*Assistant Examiner* — Alan Graham
(74) *Attorney, Agent, or Firm* — Park, Vaughan, Fleming & Dowler LLP; Chia-Hsin Suen (57) ABSTRACT

Some embodiments of the present invention provide a system that executes a garbage collector in a computing system. During operation, the system obtains a throughput model for the garbage collector and estimates a set of characteristics associated with the garbage collector. Next, the system applies the characteristics to the throughput model to estimate a throughput of the garbage collector. The system then determines a level of performance for the garbage collector based on the estimated throughput. Finally, the system adjusts a tunable parameter for the garbage collector based on the level of performance to increase the throughput of the garbage collector.

17 Claims, 5 Drawing Sheets

MAXIMIZING THROUGHPUT FOR A GARBAGE COLLECTOR

BACKGROUND

1. Field of the Invention

The present invention relates to techniques for performing garbage collection. More specifically, the present invention relates to a method and system for maximizing throughput for a garbage collector.

2. Related Art

The throughput of a generational garbage collector is highly dependent on various parameters associated with the generational garbage collector, such as the relative sizes of memory regions for different generations and/or the tenuring threshold of objects within the heap. The behavior of the generational garbage collector may additionally be affected by other considerations, such as a maximum pause time during which garbage collection is performed and/or a maximum footprint of the heap.

In particular, a tradeoff between throughput, pause time, and footprint may occur from variations in generation sizes and in the tenuring threshold. For example, a very large young generation may increase throughput at the expense of footprint and pause time. Similarly, the tenuring threshold may affect generation sizes and pause times.

Existing techniques for tuning generational garbage collector performance involve the use of heuristics to adjust generation sizes, tenuring thresholds, and/or other parameters associated with the garbage collector. For example, a heuristic policy for dynamically adjusting generation sizes may try to meet, in order of importance, a pause time goal, a throughput goal, and a maximum footprint goal. Policies for dynamically adapting the tenuring threshold may involve the comparison of relative amounts of time spent on minor and major garbage collections and/or the promotion of enough data out of a particular generation to meet a pause time goal. However, such policies are unable to determine generation sizes and/or tenuring thresholds that maximize and/or optimize garbage collection throughput for a given pause time goal and footprint goal. Hence, generational garbage collector performance may be improved by a comprehensive analysis of the factors affecting throughput, pause time, footprint, and/or other considerations related to garbage collection.

SUMMARY

Some embodiments of the present invention provide a system that executes a garbage collector in a computing system. During operation, the system obtains a throughput model for the garbage collector and estimates a set of characteristics associated with the garbage collector. Next, the system applies the characteristics to the throughput model to estimate a throughput of the garbage collector. The system then determines a level of performance for the garbage collector based on the estimated throughput. Finally, the system adjusts a tunable parameter for the garbage collector based on the level of performance to increase the throughput of the garbage collector.

In some embodiments, determining the level of performance involves computing a first predicted throughput of the garbage collector based on a small increment of the tunable parameter, computing a second predicted throughput of the garbage collector based on a small decrement of the tunable parameter, and comparing the first predicted throughput and the second predicted throughput with the throughput. In these embodiments, the tunable parameter is incremented or decremented based on the highest value found among the throughput, the first predicted throughput, and the second predicted throughput.

In some embodiments, the tunable parameter is incremented or decremented by an amount that is determined by numerically evaluating derivatives of at least one of the characteristics and using the derivatives to determine a change in the tunable parameter that results in a maximum throughput from the throughput model.

In some embodiments, a higher value for the throughput than the first predicted throughput and the second predicted throughput causes the tunable parameter to remain unchanged.

In some embodiments, the tunable parameter corresponds to a heap partition size associated with the garbage collector or a tenuring threshold associated with the garbage collector.

In some embodiments, adjusting the tunable parameter involves alternating between adjusting the heap partition size and adjusting the tenuring threshold.

In some embodiments, the throughput model corresponds to a nonlinear objective function and the throughput of the garbage collector is increased by maximizing the nonlinear object function.

In some embodiments, the characteristics include an average minor collection time and an amount of data promoted to tenured data.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
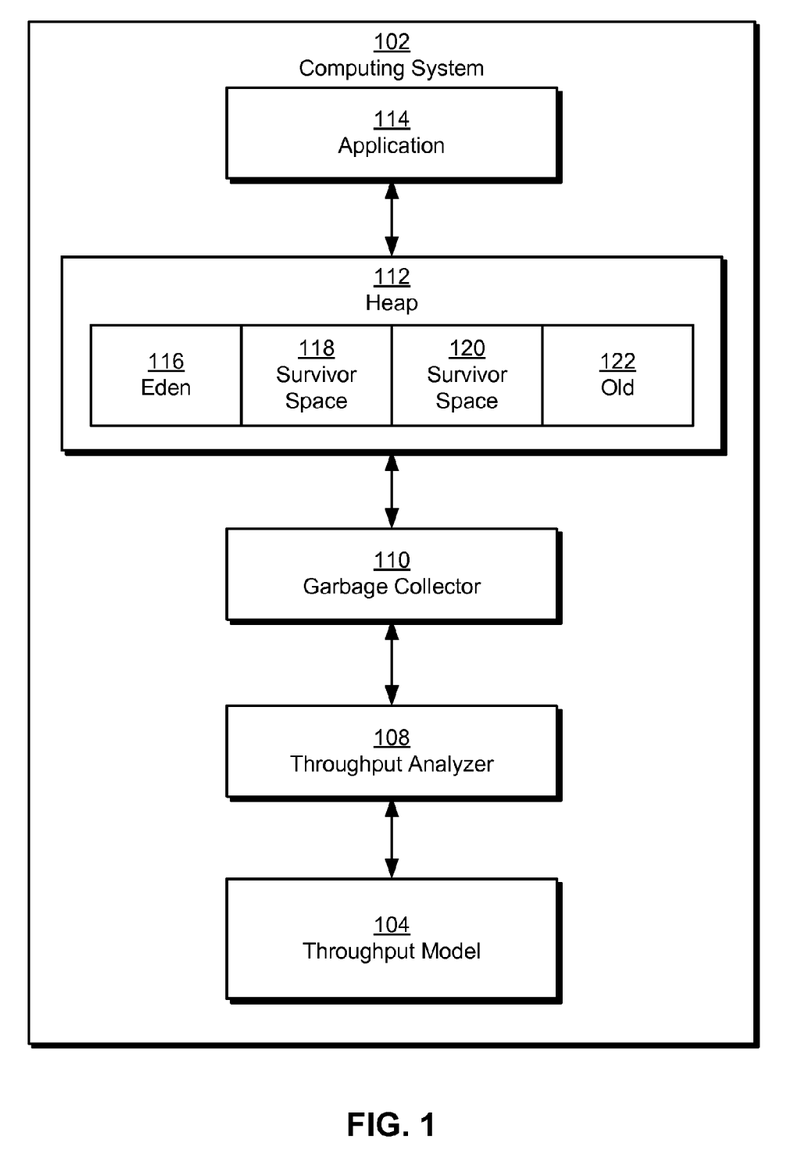
FIG. 1 shows a computing system in accordance with an embodiment of the present invention.

FIG. 1 shows a computing system 102 in accordance with an embodiment of the present invention. Computing system 102 may correspond to a personal computer (PC), server, workstation, supercomputer, mobile phone, personal digital assistant (PDA), media player, and/or other type of electronic computing device. Computing system 102 includes an application 114 that may execute using resources (e.g., processor, memory, input/output (I/O) devices, etc.) on computing system 102. Application 114 may correspond to an operating system, word processor, email client, web browser, game, device driver, windowing system, utility, and/or other piece of software.

In one or more embodiments of the invention, memory used by application 114 may be obtained from a heap 112 provided by computing system 102. Furthermore, memory from heap 112 may be dynamically allocated to and deallocated from application 114. In other words, objects of arbitrary size and length may be created by application 114 and stored in heap 112 by a memory allocator (not shown) associated with application 114. Similarly, a garbage collector 110 within computing system 102 may be used to reclaim memory from unused objects associated with application 114 in heap 112.

In one or more embodiments of the invention, garbage collector 110 corresponds to a generational garbage collector. In other words, garbage collector 110 may divide heap 112 into a set of heap partitions (e.g., Eden 116, survivor spaces 118-120, Old 122) and place objects from application 114 into the heap partitions based on the ages of the objects. As a result, each heap partition may store objects of a certain generation or set of generations. Garbage collector 110 may further reclaim objects in heap 112 based on the heap partitions in which the objects are stored.

In particular, objects may be allocated in an Eden 116 heap partition associated with younger objects, or a young generation. A minor collection is performed by garbage collector 110 when Eden 116 is filled; objects that survive the minor collection are then copied to one of two survivor spaces 118-120 within heap 112 as tenuring data. The other survivor space 118-120 remains empty and serves as a destination of live objects from Eden 116 and the non-empty survivor space after the next minor collection. Consequently, minor collections reclaim memory from objects in Eden 116 and the non-empty survivor space; remaining live objects after a minor collection from Eden 116 and the non-empty survivor space are then copied into the empty survivor space and the non-empty survivor space is emptied. In other words, survivor spaces 118-120 alternate with one another in storing tenuring data and remaining empty; the roles may then be switched when a minor collection occurs.

Garbage collector 110 may also include a tenuring threshold that corresponds to the number of minor collections an object must survive before the object is copied into an Old 122 heap partition within heap 112. For example, if garbage collector 110 includes a tenuring threshold of 5, an object may be copied from Eden 116 into a survivor space 118-120 and then copied back and forth four times between survivor spaces 118-120 before the object is promoted into Old 122 at the next minor collection. As a result, Old 122 may contain tenured objects that are expected to be long-lived. Furthermore, objects in Old 122 are not collected until Old 122 is filled, triggering a major collection in which all objects in heap 112 are examined for reachability and reclamation.

Those skilled in the art will appreciate that performance considerations associated with garbage collector 110 may be affected by a variety of factors. Such performance considerations may include the throughput of garbage collector 110, which may be obtained as a ratio of time associated with execution of application 114 to time associated with garbage collection; the pause times in application 114 execution that occur during garbage collection; and the footprint of heap 112, which corresponds to the size of heap 112. As explained below, computing system 102 may include mechanisms to improve the performance of garbage collector 110 with respect to throughput. Furthermore, the performance of garbage collector 110 may be improved without exceeding constraints such as a maximum pause time constraint and a maximum footprint constraint.

In one or more embodiments of the invention, the throughput of garbage collector 110 is expressed using a throughput model 104. In one or more embodiments of the invention, throughput model 104 corresponds to a nonlinear objective function of one or more tunable parameters. The tunable parameters may include the sizes of one or more heap partitions within heap 112, the tenuring threshold of garbage collector 110, and/or other settings or factors that may affect the behavior of garbage collector 110.

In one or more embodiments of the invention, the throughput of garbage collector 110 is analyzed by a throughput analyzer 108 within computing system 102. To analyze the throughput, throughput analyzer 108 may estimate a set of characteristics associated with garbage collector 110 and apply the characteristics to throughput model 104.

Furthermore, the throughput of garbage collector 110 may be optimized by examining the impact of the tunable parameters on the nonlinear objective function. In particular, the throughput of garbage collector 110 may be increased by maximizing the nonlinear objective function with respect to the tunable parameters. Increments or decrements to each tunable parameter may result in an increase or decrease in the nonlinear objective function, which in turn may correspond to an increase or decrease in the throughput of garbage collector 110. As a result, throughput model 104 may also be used by throughput analyzer 108 to determine adjustments to each of the tunable parameters that may result in improved throughput for garbage collector 110. Characteristics, tunable parameters, and/or optimization of throughput using throughput model 104 are discussed in detail below with respect to FIG. 2.

The results of throughput analysis conducted by throughput analyzer 108 may then be used to modify tunable parameters associated with garbage collector 110 and consequently improve the throughput of garbage collector 110. Furthermore, the tunable parameters may be adjusted in light of other performance considerations, such as a maximum pause time constraint and/or a maximum footprint constraint. Finally, throughput analyzer 108 may continually estimate and optimize the throughput of garbage collector 110 during the execution of application 114 to respond to changes in the behavior of application 114. As a result, throughput analyzer 108 and throughput model 104 may allow the performance of garbage collector to be improved to a greater extent than the use of heuristics.

Figure 2:
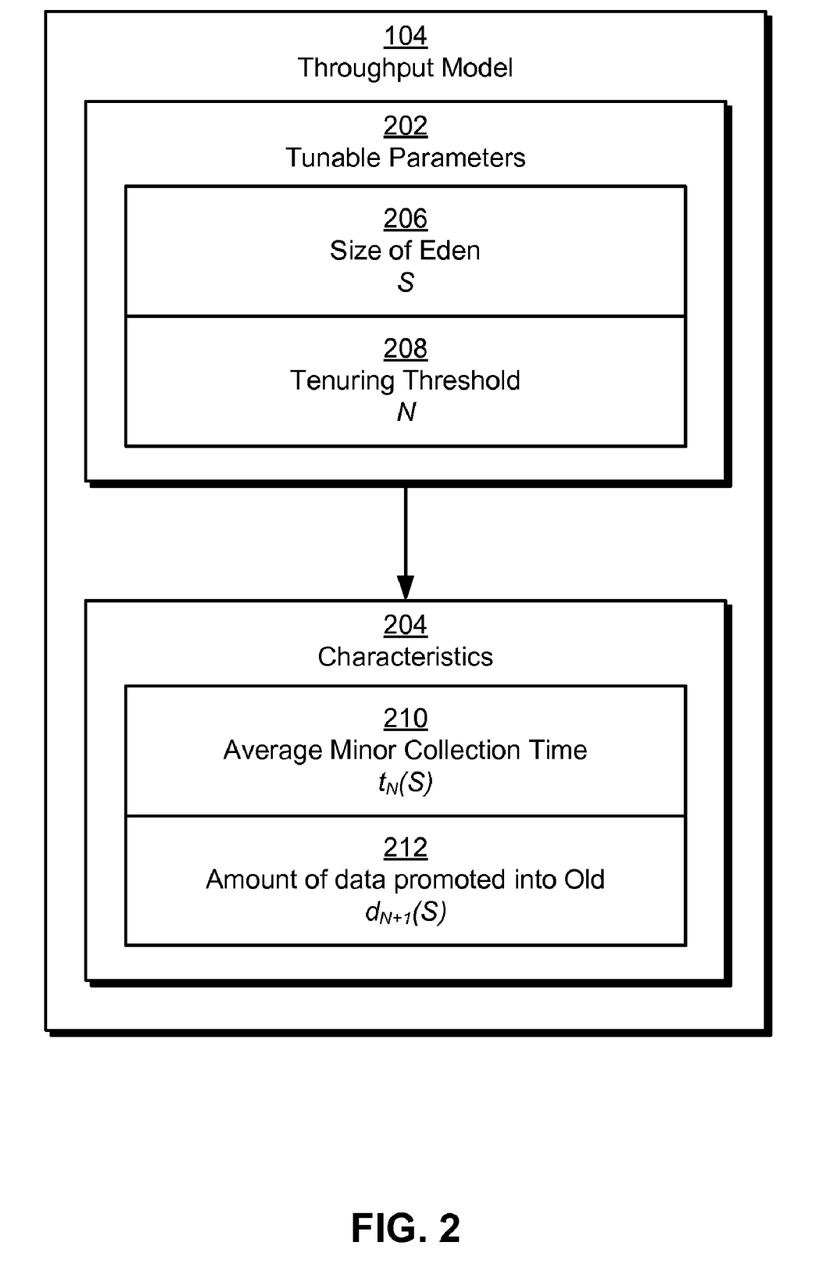
FIG. 2 shows a throughput model in accordance with an embodiment of the present invention.

FIG. 2 shows a throughput model 104 in accordance with an embodiment of the present invention. As shown in FIG. 2, throughput model 104 includes a set of tunable parameters 202 and a set of characteristics 204. In particular, throughput model 104 may correspond to a nonlinear objective function of tunable parameters 202. The derivation of the nonlinear objective function with characteristics 204 is discussed below.

As mentioned previously, the throughput of a garbage collector may correspond to a ratio of time associated with execution of an application (e.g., application 114 of FIG. 1) to time associated with garbage collection. Furthermore, the throughput may be calculated in terms of tunable parameters 202 that include a size of Eden S 206 (e.g., Eden 116 of FIG. 1) and a tenuring threshold N 208. More specifically, garbage collector throughput may be expressed as an objective function $f_N(S)$ of the following terms:

$$f_N(S) = \frac{A(S)K_N(S)}{t_N(S)K_N(S) + T + A(S)K_N(S)}$$

Within the expression, $K_N(S)$ represents the average number of minor collections between two successive major collections, and $A(S)$ represents the average amount of time during which Eden is filled. $A(S) K_N(S)$ may thus represent the average time spent on application execution between two major collections. $t_N(S)$ 210 corresponds to the average time spent on a minor collection. Consequently, $t_N(S) K_N(S)$ represents the amount of time spent on minor collections between two major collections. T represents the amount of time spent on a major collection of the garbage collector, which is independent of the size of Eden S 206 and of tenuring threshold N 208. In other words, the throughput of the garbage collector may be calculated by dividing the amount of time spent on application execution between two major collections by the total amount of time elapsed in a garbage collection cycle that includes a number of minor collections and one major collections.

Moreover, terms within the expression for throughput may be refined. In particular, $A(S)=S/r$, where r corresponds to the rate of data generation within Eden. Additionally, $t_N(S)$ may be expressed using the following:

$$t_N(S) = c + a g_N(S) = c + a \sum_{n=1}^{N} d_n(S)$$

With respect to $t_N(S)$, $d_n(S)$ represents the size of objects that survive at least n minor collections. Furthermore, $g_N(S)$ corresponds to the sum of tenuring objects in the young generation $\Sigma d_n(S)$, or the steady state amount of data stored in a survivor space (e.g., survivor spaces 118-120 of FIG. 1) as a function of size of Eden S 206 and tenuring threshold N 208. Consequently, a $g_N(S)$ represents the time required to copy live data from Eden and one survivor space to the other survivor space as a linear function of the tenuring data. Furthermore, c may account for time spent tracing references to tenuring objects in Eden and the nonempty survivor space.

Finally, $K_N(S)$ may be represented as the free space in Old after a major collection divided by the amount of data promoted into Old after each minor collection:

$$K_N(S) = \frac{H - J - 2bg_N(S) - S}{d_{N+1}(S)}$$

H represents the overall size of the heap, and J represents the amount of data that survives a major collection. Moreover, J is based only on the distribution of object lifetimes within the application and not on the size of Eden S 206 or H. 2b $g_N(S)$ represents the size of the two survivor spaces, which are a function of the steady state amount of data surviving each minor collection $g_N(S)$ multiplied by a scaling factor b to accommodate fluctuations in the amount of tenuring data. For example, b may be set such that the utilization of the nonempty survivor space is approximately 75%, or ¾. Finally, $d_{N+1}(S)$ 212 represents the size of objects that have survived one more minor collection than tenuring threshold N 208 and thus represents the amount of data promoted into Old from the survivor space with each minor collection.

Using the expressions for $A(S)$, $t_N(S)$, and $K_N(S)$, the objective function for garbage collector throughput may be rewritten as:

$$f_N(S)=1/(1+r/u_N(S))$$

Furthermore, $u_N(S)$ may correspond to the following expressions:

$$u_N(S) = \frac{S}{(c + ag_N(S)) + \frac{T}{K_N(S)}} \text{ or}$$

$$u_N(S) = \frac{S}{c + ag_N(S) + T\frac{d_{N+1}(S)}{H - J - 2bg_N(S) - S}}$$

which may be maximized to increase garbage collector throughput.

The above expression for garbage collector throughput includes terms with properties that may be verified using methods available to those skilled in the art. First, $d_n(S)$ corresponds to a concave increasing function for n=1 and is hump-shaped with an increasing region that is most likely concave for n>1. In particular, $d_n(S)$ may be analyzed in terms of a probability distribution of object lifetimes, which starts at 1 (at the time an object is created) and decreases with time to 0, which corresponds to a time at which all objects are dead. For example, object lifetimes may be modeled using a probability distribution function with the following form:

$$G(x)=1-e^{-\lambda x^k}$$

Because $d_1(S)$ may be expressed as the integral of $G(x)$ over the time during which Eden is filled for the first time (i.e., from 0 to S/r), each increment in S 206 corresponds to a smaller increment in $d_1(S)$, thus suggesting that $d_1(S)$ is a concave function of S 206. The shape and concavity of $d_n(S)$ for n>1 may be analyzed using $G(x)$ with limits of integration that correspond to the time between the minor collection that occurred previous to the nth minor collection and the nth minor collection. More specifically, the first and second derivatives of $d_n(S)$ may be taken to examine the shape and concavity of $d_n(S)$. In particular, the first and second derivatives of $d_n(S)$ indicate that when $d_n(S)$ is increasing, $d_n(S)$ is concave.

Second, the adjustment of tenuring threshold N 208 may be based on the distribution of object lifetimes within the application. More specifically, a change in N 208 affects the denominator of the objective function for throughput but not the numerator. In other words, N 208 should be increased to N+1 if the increase results in a decrease in the denominator of $u_N(S)$:

$$a(g_{N+1}(S) - g_N(S)) + T\left(\frac{1}{K_{N+1}(S)} - \frac{1}{K_N(S)}\right) < 0$$

If the sizes of all heap partitions (e.g., Eden, survivor spaces, Old) are fixed, then the inequality may be rewritten as $$ad_{N+1}(S) + (T/(W-S))(d_{N+2}(S) - d_{N+1}(S)) < 0$$

or equivalently as $$\frac{a(W-S)}{T} < 1 - \frac{d_{N+2}(S)}{d_{N+1}(S)}$$

where W=H−J−2R and R represents the fixed size of a survivor space.

Using G(x) as the probability distribution function for object lifetimes, N 208 may be adjusted based on the above inequality and the properties of G(x). Applying G(x) to the right side of the inequality results in the following:

$$\frac{d_{N+2}(S)}{d_{N+1}(S)} \approx \frac{e^{-\lambda((N+1)S/r)^k} + e^{-\lambda(NS/r)^k}}{e^{-\lambda((N-1)S/r)^k} + e^{-\lambda(NS/r)^k}}$$

For small S 206, the right hand side of the inequality is close to zero, suggesting that the optimal tenuring threshold N 208 is equal to 1 for small Eden sizes. Otherwise, an increase in N 208 results in reduced throughput for an application with long-lived objects, since the amount of data in the survivor space may increase while the amount of data copied into Old stays roughly constant.

On the other hand, if most objects are not long-lived, an increase in N 208 may result in increased throughput, since the amount of data in the survivor space may increase minimally while the amount of data copied into Old decreases. Such changes in the distribution of data within the heap suggest that while the time spent on minor collections may increase slightly, the frequency of major collections may decrease significantly, thus decreasing the total amount of time spent on garbage collection between two successive major collections.

Third, the behavior of the garbage collector may be subject to additional considerations, such as a maximum application footprint and a maximum pause time. One or both limits may be surpassed if S 206 is increased without decreasing the size of Old. As a result, an increase in S 206 may be offset by an equal decrease in the size of Old to keep the overall heap size constant. Furthermore, the size of the young generation (i.e., S 206 and the two survivor space sizes, which depend on S 206) should be kept relatively large (e.g., at around (H−J)/2) because the denominator of $u_N(S)$ is likely to grow slower than the numerator prior to that point.

On a higher level, an increase in S 206 decreases the frequency of minor collections. The frequency of major collections may be also be decreased by increasing the number of minor collections between two successive major collections, since with large S 206 the amount of data promoted to Old $d_{N+1}(S)$ may decrease as a function of S 206, as discussed above. Furthermore, the amount of time spent on each minor collection (i.e., $C+ag_N(S)$) grows more slowly than S 206 for large S 206, since $g_N(S)$ is a concave function of S 206. The amount of live data in the survivor space may also decrease with S 206 as fewer objects survive the time between two minor collections.

To estimate the throughput of the garbage collector, characteristics 204 may be estimated with respect to tunable parameters 202 and applied to throughput model 104. The estimated throughput may then be used to determine a level of performance for the garbage collector and adjust one or more tunable parameters 202 to increase the throughput of the garbage collector. In addition, the throughput of the garbage collector may be continually optimized during application execution by alternating between adjusting size of Eden S 208 and tenuring threshold N 208, as described below with respect to FIG. 5.

Figure 3:
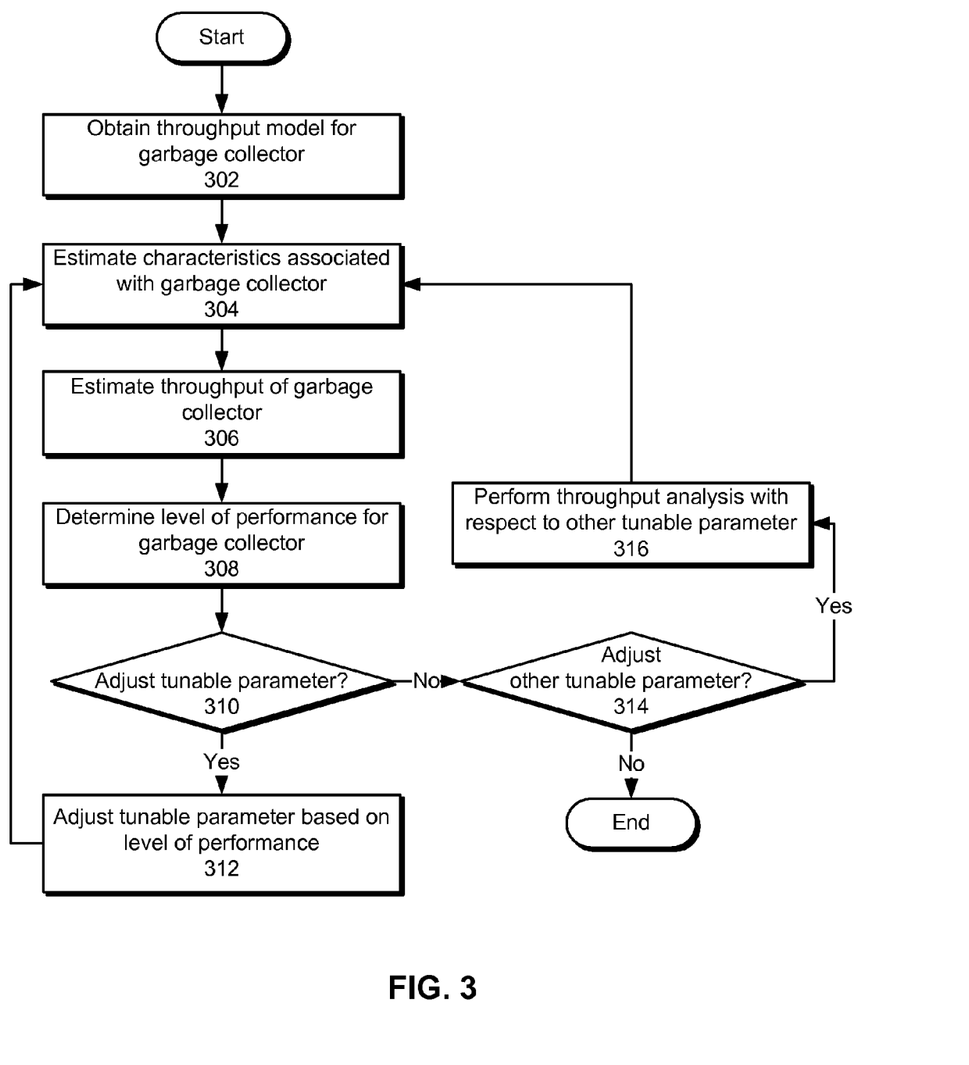
FIG. 3 shows a flowchart illustrating the process of increasing the throughput of a garbage collector in accordance with an embodiment of the present invention.

FIG. 3 shows a flowchart illustrating the process of increasing the throughput of a garbage collector in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

To begin optimizing throughput, a throughput model for the garbage collector is obtained (operation 302). The throughput model may correspond to a nonlinear objective function that may be maximized to increase garbage collector throughput. The throughput model may also include a number of characteristics associated with the garbage collector that are estimated (operation 304). As described above, the characteristics may include an average minor collection time and an amount of data promoted into Old (i.e., tenured data) with each minor collection. The characteristics may also include the time to perform a major collection and the amount of data surviving a major collection. Because the characteristics are affected by tunable parameters within the throughput model, estimation of the characteristics may provide an indication of the garbage collector's throughput with respect to the tunable parameters and allow the throughput to be increased by adjusting the tunable parameters.

The throughput of the garbage collector is then estimated (operation 306) by applying the characteristics to the throughput model. In other words, a value for an objective function for throughput may be calculated using the characteristics. The estimated throughput may then be used to determine a level of performance for the garbage collector (operation 308). Determining the level of performance for the garbage collector is described below with respect to FIG. 4.

The throughput of the garbage collector may be optimized by adjusting a tunable parameter associated with the garbage collector (operation 310). Tunable parameters for the garbage collector may include the size of Eden, the tenuring threshold, and/or other factors that affect the behavior of the garbage collector. If the throughput of the garbage collector may be increased by adjusting the tunable parameter, the tunable parameter is adjusted based on the garbage collector's level of performance (operation 312). If the throughput of the garbage collector is unlikely to be increased by adjusting the tunable parameter, throughput analysis with respect to the tunable parameter is stopped.

However, the throughput may be optimized by adjusting another tunable parameter (operation 314). For example, after the throughput is maximized with respect to the size of Eden, the throughput may be maximized with respect to the tenuring threshold. If throughput may be improved by adjusting the other tunable parameter, the throughput analysis is performed with respect to the other tunable parameter (operation 316). In other words, characteristics associated with the garbage collector are estimated (operation 304) and the throughput of the garbage collector is estimated using the characteristics (operation 306). The level of performance for the garbage collector is then determined in terms of the other tunable parameter (operation 308). If the level of performance indicates that the tunable parameter should be adjusted (operation 310), the tunable parameter is adjusted based on the level of performance (operation 312) to increase the throughput. Otherwise, throughput optimization may continue with a different tunable parameter (operation 314) until throughput optimization is complete. For example, the throughput may be optimized in terms of Eden size and tenuring threshold by alternating between adjusting Eden size and adjusting tenuring threshold until the application completes execution. If more than two tunable parameters exist, optimization of throughput may cycle through the tunable parameters in a variety of ways. For example, adjustments to a tunable parameter may be made if indicators show that throughput is adversely affected by the current value of the tunable parameter. Tunable parameters may also be adjusted concurrently rather than serially.

Figure 4:
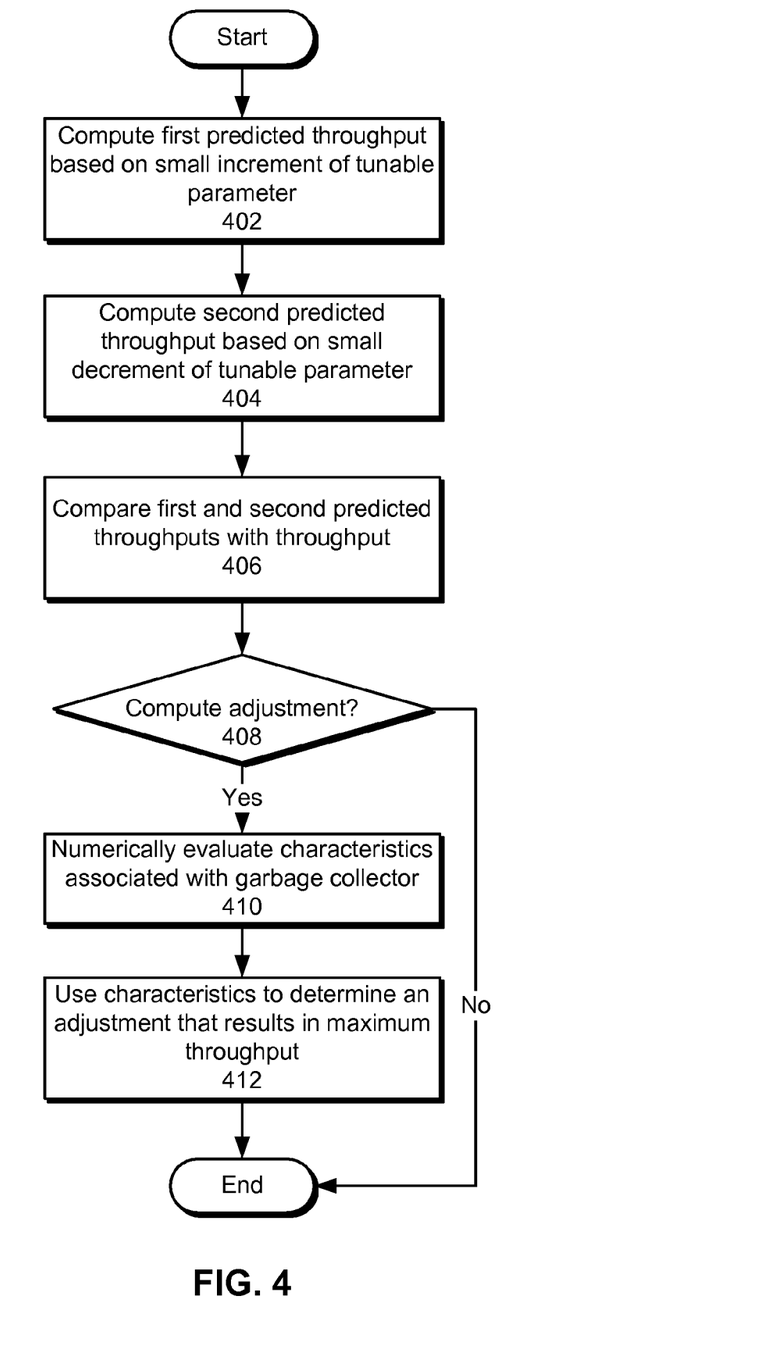
FIG. 4 shows a flowchart illustrating the process of computing an adjustment to a tunable parameter for a garbage collector in accordance with an embodiment of the present invention.

FIG. 4 shows a flowchart illustrating the process of computing an adjustment to a tunable parameter for a garbage collector in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

As mentioned previously, the process of FIG. 4 is used to determine the level of performance for the garbage collector. In particular, the process of FIG. 4 may be used to determine an optimality of the garbage collector's throughput in terms of a tunable parameter. Furthermore, the process of FIG. 4 may be used to determine an adjustment to the tunable parameter that may increase the throughput of the garbage collector.

To determine the level of performance of the garbage collector, a first predicted throughput based on a small increment of the tunable parameter is computed (operation 402). Similarly, a second predicted throughput based on a small decrement of the tunable parameter is also computed (operation 404). For example, the first predicted throughput and second predicted throughput may be computed using small increments and decrements of the current size of Eden.

The first and second predicted throughputs are then compared with the throughput estimated in FIG. 3 (operation 406). The results of the comparison may be used to determine if an adjustment to the tunable parameter should be computed (operation 408). In particular, a highest value among the throughput, the first predicted throughput, and the second predicted throughput may determine a direction in which the tunable parameter is changed. If the first predicted throughput is the highest value, the tunable parameter is incremented. If the second predicted throughput is the highest value, the tunable parameter is decremented. Finally, if the throughput is the highest value, the tunable parameter is unchanged and an adjustment is not computed.

If an adjustment is to be computed, characteristics associated with the garbage collector are numerically evaluated (operation 410). Moreover, derivatives of the characteristics may be also be numerically evaluated if the tunable parameter is continuous (e.g., Eden size), as discussed below with respect to FIG. 5. The characteristics and/or derivatives may then be used to determine an adjustment that results in maximum throughput from the throughput model (operation 412). More specifically, once the direction of change in the tunable parameter is established in operations 402-406, the derivative of the throughput may be computed to determine a change in the tunable parameter that causes the derivative to be zero (i.e., maximum). Alternatively, the adjustment to the tunable parameter may be based on a set of heuristics. For example, the tunable parameter may be adjusted by a percentage in the direction of change that optimizes throughput. Furthermore, the adjustment to the tunable parameter may be subject to additional constraints, such as a maximum pause time or maximum footprint associated with the garbage collector.

Figure 5:
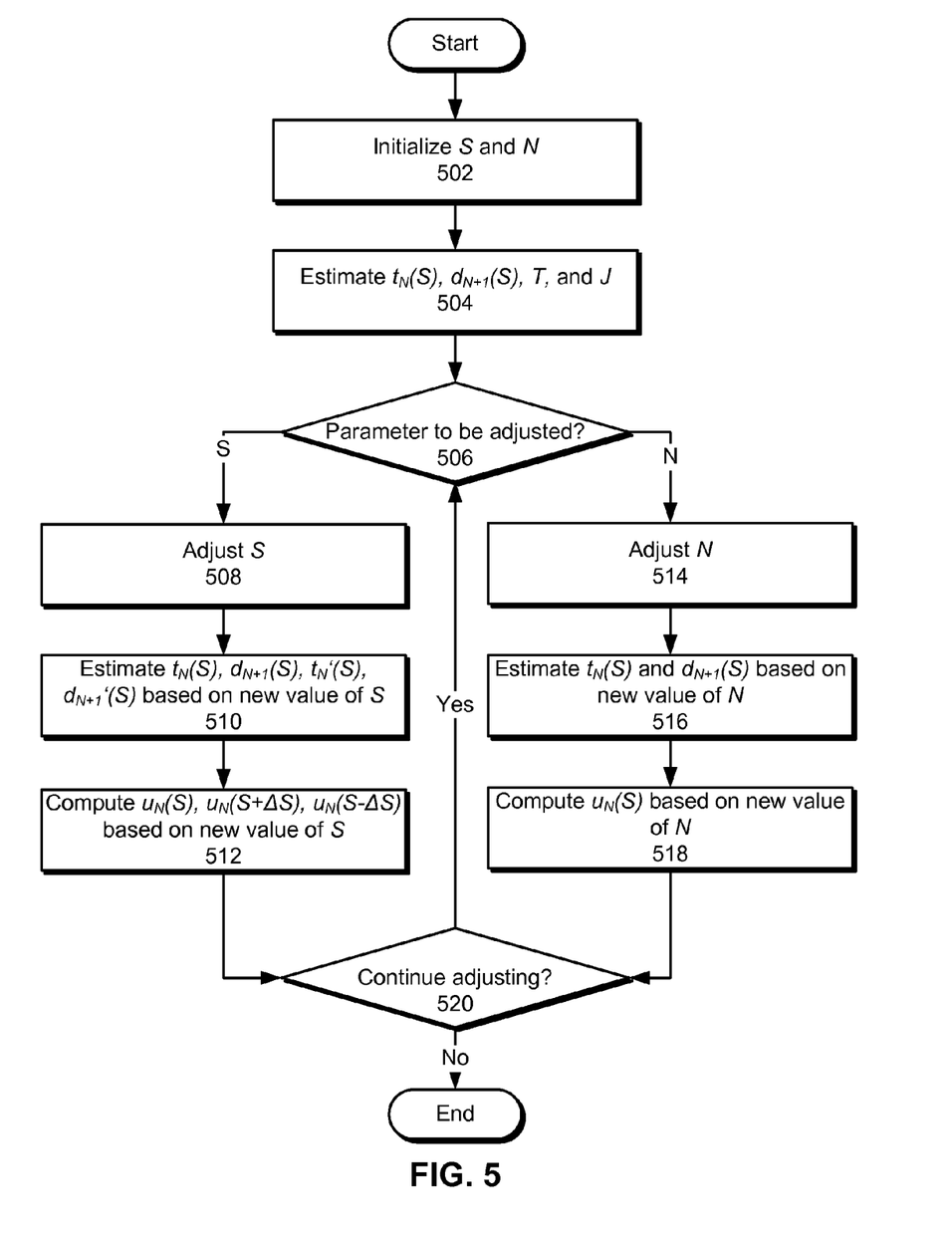
FIG. 5 shows a flowchart illustrating the process of optimizing garbage collector throughput by adjusting the Eden size and tenuring threshold of the garbage collector in accordance with an embodiment of the present invention.

FIG. 5 shows a flowchart illustrating the process of optimizing garbage collector throughput by adjusting the Eden size and tenuring threshold of the garbage collector in accordance with an embodiment of the present invention. In one or more embodiments of the invention, one or more of the steps may be omitted, repeated, and/or performed in a different order. Accordingly, the specific arrangement of steps shown in FIG. 5 should not be construed as limiting the scope of the invention.

In one or more embodiments of the invention, throughput optimization occurs continuously during application execution. Adjustment of survivor space size may also occur during application execution to maintain a certain level of utilization in the nonempty survivor space. For example, an overflow of the survivor space may trigger an increase in the size of the survivor space, while a drop in data below a certain threshold (e.g., 90% of the survivor space) may trigger a decrease in the size of the survivor space.

Similarly, the garbage collector may be started with tunable parameters set at default values (operation 502) that are based on analysis of the throughput objective function described above. For example, Eden size S may initially be of the same size as Old, and tenuring threshold N may initially be set to 1.

Actual optimization of garbage collector throughput may begin after characteristics of the garbage collector have been estimated (operation 504). More specifically, $t_N(S)$ and $d_{N+1}(S)$ may be estimated as arithmetic averages of corresponding values observed during a sequence of consecutive minor collections (e.g., five). T and J may be estimated after one major collection has occurred and may continue to be estimated after each major collection. Other characteristics, such as the steady-state size of each survivor space and/or the amount of data in the survivor space, may also be estimated during this time. After such characteristics are estimated, garbage collector throughput may be optimized by adjusting S or N (operation 506).

After the first major collection and estimations of characteristics in operation 504, S may be adjusted (operation 508). In particular, S may be slightly increased (e.g., by ten percent) after the first major collection. Next, after a series of minor collections, $t_N(S)$ and $d_{N+1}(S)$ are estimated using the new value of S, and their first derivatives $t_N'(S)$ and $d_{N+1}'(S)$ are estimated as changes in $t_N(S)$ and $d_{N+1}(S)$ divided by the change in S (operation 510).

Using $t_N(S)$ and $d_{N+1}(S)$ and their derivatives, values for $u_N(S)$, a first predicted throughput based on an increment of S (i.e., $u_N(S+\Delta S)$), and a second predicted throughput based on a decrement of S (i.e., $u_N(S-\Delta S)$) are computed (operation 512). To calculate the throughput based on the increment and decrement, the denominator of the objective function $u_N(S)$ is set as $Z_N(S)$:

$$Z_N(S) = c + ag_N(S) + T/K_N(S)$$

In addition, the denominator of the objective function may be approximated for an increment of S using the following:

$$Z_N(S+\Delta S) \approx [t_N(S) + \Delta S t'_N(S)] + T \frac{[d_{N+1}(S) + \Delta S d'_{N+1}(S)]}{H - J - 2(x_N(S)(1+\Delta S/S)) - (S+\Delta S)}$$

Similarly, $Z_N(S-\Delta S)$ may be calculated by substituting $S-\Delta S$ for $S+\Delta S$ above. Calculations for $u_N(S)$, $u_N(S+\Delta S)$, and $u_N(S-\Delta S)$ may then be made by dividing S, $S+\Delta S$, and $S-\Delta S$ by $Z_N(S)$, $Z_N(S+\Delta S)$, and $Z_N(S-\Delta S)$, respectively.

S may continue to be adjusted based on a comparison of $u_N(S)$, $u_N(S+\Delta S)$, and $u_N(S-\Delta S)$ (operation 520). More specifically, the highest value among $u_N(S)$, $u_N(S+\Delta S)$, and $u_N(S-\Delta S)$ determines the direction in which S is adjusted to increase throughput, if any. In other words, if $u_N(S+\Delta S)$ is the highest value of the three, S is increased. If $u_N(S-\Delta S)$ is the highest value, S is decreased. Finally, if $u_N(S)$ is the highest value, garbage collector throughput is optimized with respect to S and may be left untouched for the time being.

As a result, the determination of the parameter to be adjusted (operation 506) may be based on the values of $u_N(S)$, $u_N(S+\Delta S)$, and $u_N(S-\Delta S)$. If S is to be incremented or decremented, S is again adjusted (operation 508) based on the increment or decrement. Furthermore, the adjustment of S may be determined using a variety of methods. For example, S may be adjusted according to an increment or decrement (i.e., $\Delta S$) that maximizes the objective function. A computation of a positive or negative $\Delta S$ that maximizes the objective function may also take place in lieu of the calculations for $u_N(S+\Delta S)$ and $u_N(S-\Delta S)$ in operation 512.

In other words, a new value of S may be calculated such that the derivative of the objective function with respect to S is zero (i.e., $u_N'(S)=0$). Those skilled in the art will appreciate that such a calculation for S may be made using the following:

$$\frac{(S+\Delta S)}{S} = \frac{Z_N(S+\Delta S)}{Z_N(S)}$$

Alternatively, S may be adjusted using a set of heuristics. For example, S may be incremented or decremented by a percentage (e.g., five percent) as long as the increment or decrement does not surpass a limit to the size of S (e.g., S plus the free space in Old). Furthermore, minimum and maximum increments and decrements may be imposed on each adjustment to S. For example, S may be incremented by a minimum of one percent and a maximum of 20 percent and decremented by a minimum of one percent and a maximum of ten percent. In addition, the maximum increment may be decreased as S approaches the limit to the Eden size.

Each time S is adjusted, estimates of $t_N(S)$ and $d_{N+1}(S)$ and their derivatives are made (operation 510). The throughput of the garbage collector is estimated (operation 512) and potential changes to the throughput are computed using an increment, decrement, and/or other value of S that may increase the throughput. S may continue to be adjusted (operation 520, operation 506) as long as the optimal change, if any, continues in the same direction (i.e., continues to increase or decrease). However, once the direction of change is reversed and/or $u_N(S)$ is calculated as the highest value, the parameter to be adjusted (operation 506) may be switched to the tenuring threshold N. In one or more embodiments of the invention, adjustments to N may be triggered if S is optimally adjusted; a number of minor collections (e.g., 10) are expected to occur before the next major collection; and/or a major collection has occurred (which produces new estimates of T and J).

As mentioned above, N may initially be set to 1. Furthermore, adjustments to N involve increments or decrements to N by 1. As a result, N may first be adjusted (operation 514) by incrementing by 1. After the adjustment, new values of $t_N(S)$ and $d_{N+1}(S)$ are estimated (operation 516) and used to compute $u_N(S)$ (operation 518). N may continue to be adjusted (operation 520, operation 506) in the current direction of change if the new value of $u_N(S)$ is higher than the old value of $u_N(S)$. For example, if N is incremented to 2 from 1 and $u_N(S)$ is higher for N=2, N is incremented again to 3 and $u_N(S)$ is evaluated based on the increment (operations 514-518). However, once a directional change in N results in a decrease in $u_N(S)$, the change is undone and the parameter to be adjusted (operation 506) is switched to S. After adjustments to S are complete, N is adjusted in the opposite direction from the previous series of adjustments. For example, if N was incremented in a previous round of adjustments, N is decremented after adjustments to S are finished and adjustments to N are resumed.

In other words, throughput optimization may be performed by alternating between adjusting S and N since the optimal values of S and N may depend on each other. Adjustments to S and N may also take place concurrently, as described above. Furthermore, while S and N may converge to optimal values for maximizing throughput if the application's workload remains constant, adjustments to both parameters may continue to occur (operation 520) throughout the execution of the application to optimize throughput in response to changes in the application's behavior.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing a garbage collector in a computing system, comprising:
   in a processor, performing operations for:
   obtaining a throughput model for the garbage collector, wherein the throughput model comprises a nonlinear objective function that relates a throughput of the garbage collector to a quotient of a first amount of time spent on application execution between two major collections and a second amount of time elapsed in a garbage collection cycle that includes a predetermined number of minor collections and a major collection;
   estimating a set of characteristics associated with the garbage collector;
   applying the characteristics to the throughput model to estimate a throughput of the garbage collector;
   determining a level of performance for the garbage collector based on the estimated throughput; and
   adjusting a tunable parameter for the garbage collector based on the level of performance to increase the throughput of the garbage collector, wherein the tunable parameter comprises at least one of a heap partition size associated with the garbage collector, a tenuring threshold associated with the garbage collector, or a setting that effects the behavior of the garbage collector.

2. The method of claim 1, wherein determining the level of performance involves:
   computing a first predicted throughput of the garbage collector based on a small increment of the tunable parameter;
   computing a second predicted throughput of the garbage collector based on a small decrement of the tunable parameter; and
   comparing the first predicted throughput and the second predicted throughput with the throughput,
   wherein the tunable parameter is incremented or decremented based on the highest value found among the throughput, the first predicted throughput, and the second predicted throughput.

3. The method of claim 2, wherein the tunable parameter is incremented or decremented by an amount that is determined by:
   numerically evaluating derivatives of at least one of the characteristics; and
   using the derivatives to determine a change in the tunable parameter that results in a maximum throughput from the throughput model.

4. The method of claim 2, wherein a higher value for the throughput than the first predicted throughput and the second predicted throughput causes the tunable parameter to remain unchanged.

5. The method of claim 1, wherein adjusting the tunable parameter involves alternating between adjusting the heap partition size and adjusting the tenuring threshold.

6. The method of claim 1,
   wherein the throughput of the garbage collector is increased by maximizing the nonlinear object function.

7. The method of claim 1, wherein the characteristics comprise an average minor collection time and an amount of data promoted to tenured data.

8. A computer system that executes a garbage collector, comprising:
   a throughput model for the garbage collector, wherein the throughput model comprises a nonlinear objective function which is a mathematical expression relating a throughput of the garbage collector to a quotient of a first amount of time spent on application execution between two major collections and a second amount of time elapsed in a garbage collection cycle that includes a predetermined number of minor collections and a major collection; and
   a processor that performs operations of a throughput analyzer configured to:
   estimate a set of characteristics associated with the garbage collector;
   apply the characteristics to the throughput model to estimate a throughput of the garbage collector;
   determine a level of performance for the garbage collector based on the estimated throughput; and
   adjust a tunable parameter for the garbage collector based on the level of performance to increase the throughput of the garbage collector, wherein the tunable parameter comprises at least one of a heap partition size associated with the garbage collector, a tenuring threshold associated with the garbage collector, or a setting that effects the behavior of the garbage collector.

9. The system of claim 8, wherein the throughput analyzer is configured to determine the level of performance for the garbage collector by:
   computing a first predicted throughput of the garbage collector based on a small increment of the tunable parameter;
   computing a second predicted throughput of the garbage collector based on a small decrement of the tunable parameter; and
   comparing the first predicted throughput and the second predicted throughput with the throughput,
   wherein the tunable parameter is incremented or decremented based on the highest value found among the throughput, the first predicted throughput, and the second predicted throughput.

10. The system of claim 9, wherein the tunable parameter is incremented or decremented by an amount that is determined by:
    numerically evaluating derivatives of at least one of the characteristics; and
    using the derivatives to determine a change in the tunable parameter that results in a maximum throughput from the throughput model.

11. The system of claim 9, wherein a higher value for the throughput than the first predicted throughput and the second predicted throughput causes the tunable parameter to remain unchanged.

12. The system of claim 8, wherein adjusting the tunable parameter involves alternating between adjusting the heap partition size and adjusting the tenuring threshold.

13. The system of claim 8,
    wherein the throughput of the garbage collector is increased by maximizing the nonlinear object function.

14. The system of claim 8, wherein the characteristics comprise an average minor collection time and an amount of data promoted to tenured data.

15. A non-transitory computer-readable storage medium storing instructions that when executed by a computer cause the computer to perform a method for executing a garbage collector in a computing system, the method comprising:
    obtaining a throughput model for the garbage collector, wherein the throughput model comprises a nonlinear objective function that relates a throughput of the garbage collector to a quotient of a first amount of time spent on application execution between two major collections and a second amount of time elapsed in a garbage collection cycle that includes a predetermined number of minor collections and a major collection;
    estimating a set of characteristics associated with the garbage collector;
    applying the characteristics to the throughput model to estimate a throughput of the garbage collector;
    determining a level of performance for the garbage collector based on the estimated throughput; and
    adjusting a tunable parameter for the garbage collector based on the level of performance to increase the throughput of the garbage collector, wherein the tunable parameter comprises at least one of a heap partition size associated with the garbage collector, a tenuring threshold associated with the garbage collector, or another setting that effects the behavior of the garbage collector.

16. The computer-readable storage medium of claim 15, wherein determining the level of performance involves:
  computing a first predicted throughput of the garbage collector based on a small increment of the tunable parameter;
  computing a second predicted throughput of the garbage collector based on a small decrement of the tunable parameter; and
  comparing the first predicted throughput and the second predicted throughput with the throughput, wherein the tunable parameter is incremented or decremented based on the highest value found among the throughput, the first predicted throughput, and the second predicted throughput.

17. The computer-readable storage medium of claim 15, wherein adjusting the tunable parameter involves alternating between adjusting the heap partition size and adjusting the tenuring threshold.

* * * * *